March 28, 1967 F. A. KOCIAN 3,311,429
SELF-ALIGNING BEARING ASSEMBLY
Filed Aug. 21, 1964
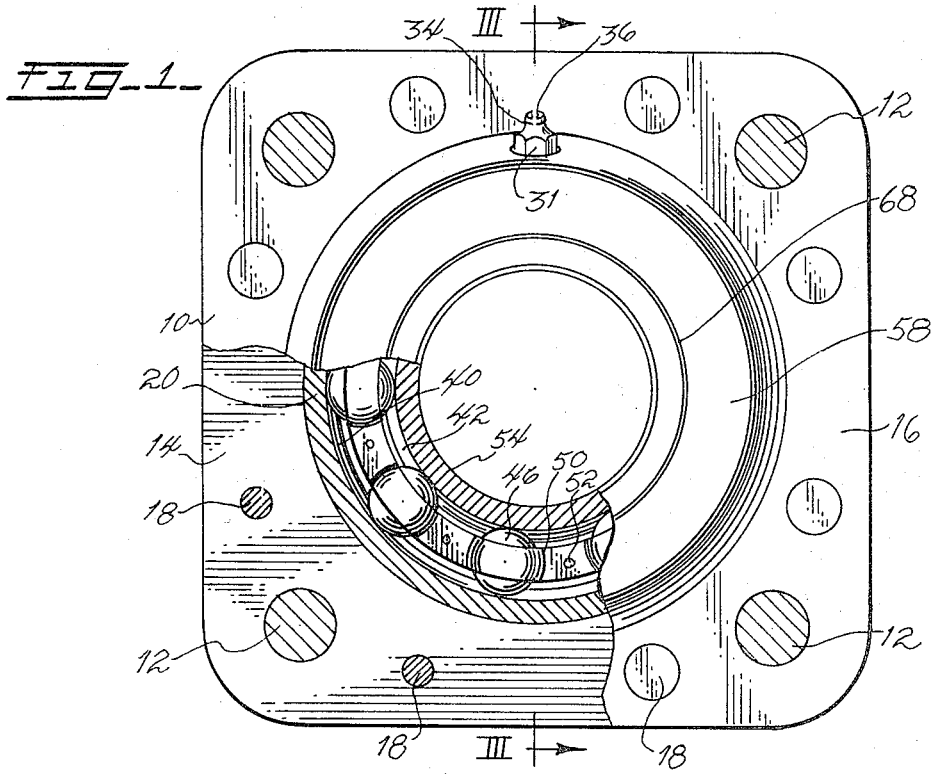
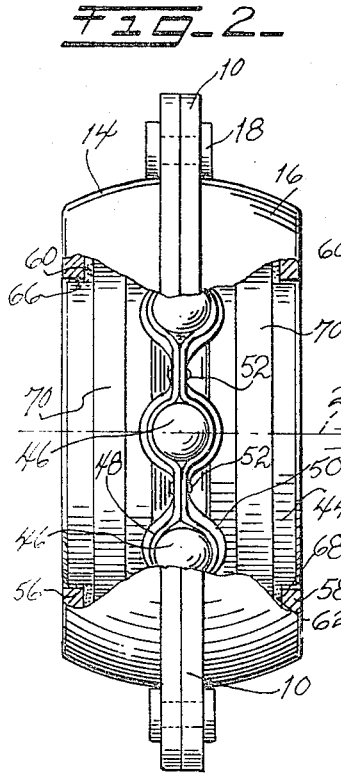
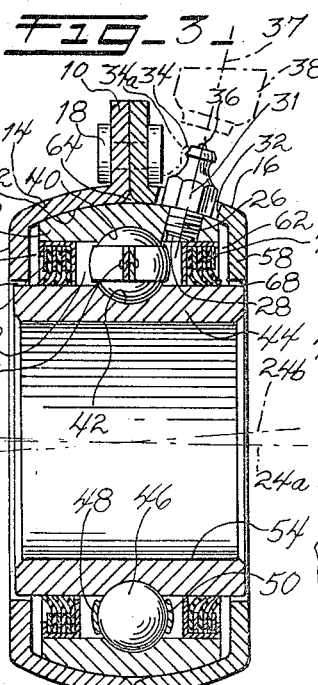
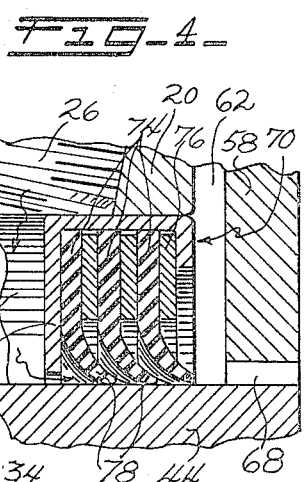
INVENTOR.
FRANK A. KOCIAN
BY John W. Gaines
ATT'Y

United States Patent Office 3,311,429
Patented Mar. 28, 1967

3,311,429
SELF-ALIGNING BEARING ASSEMBLY
Frank A. Kocian, Evergreen Park, Ill., assignor to International Harvester Company, Chicago, Ill., a corporation of New Jersey
Filed Aug. 21, 1964, Ser. No. 391,097
15 Claims. (Cl. 308—187)

This application relates to a sealed bearing assembly comprising an anti-friction bearing provided with an outer race, and received in a bearing-shrouding unitary cartridge which supports such race. The outer race is relatively movable due to a lubricated, frusto-spherical interface of sliding contact provided between it and the cartridge, and thus the bearing assembly is self-aligning.

An object of my invention is to provide an assembly of the foregoing construction, in which the sealed bearing assembly is unitized by being permanently confined within and by the cartridge of the assembly.

Another object is the provision of an assembly such as the foregoing, wherein the anti-friction bearing has a primary grease chamber defined within the interior of the outer race, and wherein the outer race is arranged to directly carry a grease-introducing fitting communicatively interconnected with the interior thereof and projecting externally through an oversize, outside opening in the cartridge wall.

An additional object is to provide a bearing assembly having a primary grease chamber within the outer race as descrbed, wherein the anti-friction bearing is a permanently sub-assembled bearing unit, and wherein such bearing unit and a pair of radial end flanges provided on the cartridge define secondary grease chambers which communicate directly with the lubricated interface of contact between the outer race and cartridge so as to supply the lubricant.

An additional object, in line with the foregoing objective, is to provide one-way-opening seals in the anti-friction bearing between the primary grease chamber and each of the secondary grease chambers, such seals opening to pass flushing grease into the secondary grease chambers so as to establish therein a grease barrier to collect and wet incoming grit, which would otherwise contaminate and abrade the lips of the seals and the bearing parts at an accelerated rate of wear.

A specific object of my invention is to provide, in a unitary self-aligning bearing assembly of the type adapted to rotatably support shafting such as a harrow disk arbor; anti-friction means provided with a movable outer race member; a relatively fixed member adapted to support the outer race member, the two members having sliding coacting surfaces of spherical cross section; generally radial end flanges providing shrouds at the ends of the support member and forming, with the anti-friction means, axially-gapped means in which lubricant is forced primarily radially, and narrow radially-gapped means in which lubricant is forced to escape externally primarily axially; the interior of the anti-friction means defining a primary grease chamber adapted to be overcharged with lubricant periodically for flushing the anti-friction means; the axially-gapped means defining secondary grease chambers; one-way-opening seals carried by the anti-friction means between the primary and secondary grease chambers; the axially-gapped means having a larger gap than the narrow-gapped means, and cooperating with the seals to accommodate force-flushed lubricant in a path of flow emitting from the filled primary grease chamber, forcing past the one-way-opening seals, and preferentially filling the secondary grease chambers prior at least to any substantial escape of lubricant externally through the narrow-gapped means.

Further features, objects and advantages will either be specifically pointed out or become apparent when, for a better understanding of the invention, reference is made to the accompanying drawing which shows a preferred embodiment thereof and in which:

FIGURE 1 is a front elevational view of the face of a unitized cartridge bearing embodying the present invention;

FIGURE 2 is a bottom plan view, partly broken away, of the bearing shown in FIGURE 1;

FIGURE 3 is a side elevational view taken in longitudinal section along the lines III—III in FIGURE 1;

FIGURE 4 is a longitudinal side elevational view drawn to enlarged scale, and showing a detail of and corresponding to FIGURE 3; and FIGURE 5 is a face-on view of a detail of FIGURE 3, looking down the uppermost diagonal axis.

More particularly in the figures of drawing, the unit cartridge shown is adapted to be supported from the hanger plate of a harrow frame, and presents a square-shaped, central, radially outwardly extending attachment rib 10, which, at the four corners, receives through bolts 12 that are secured to the hanger plate, not shown. The actual housing or cartridge comprises left and right halves 14 and 16 which are sheet metal pressings or stampings and which are substantially identical so as to mate at their flat inner flanges and jointly provide the rib 10. The halves 14 and 16 are permanently secured together by rivets 18 which pass through a ring of registering openings in their respective inner flanges.

An anti-friction bearing having a movable outer race 20 fits within the cartridge, which supports the outer race. Lubricated coacting surfaces of complementary frusto-spherical shape provide an interface of contact 22, on which the anti-friction bearing can adjust its axis 24 into the various self-aligning positions of tilt shown at 24a and 24b in FIGURE 3.

A combined motion-keying and grease fitting has a threaded inner end 26 rigidly threaded into the reception end of a grease passage 28 leading through the outer race 20 and interconnecting the fitting with a primary grease chamber 30 in the interior of the anti-friction bearing. The fitting has an enlarged wear surface portion passing with clearance through an oversize opening 32 in the cartridge half 16 and terminating in a gun-receiving tip 34. The enlarged portion of the fitting on outer race has a hexagonal shape 31 for receiving a wrench used as the tool to install and to remove the fitting. During self-aligning motion of the anti-friction bearing, the fitting swings the tip 34 thereof into adjusted positions such as the position shown by the dotted lines 34a, and said outer race and the flanges 56 and 58 close the gaps 60 and 62 before the fitting can engage those sides of the oversized opening 32 which are transverse to the direction of rotation of the race 44. The fitting does not interfere with the rib 10 and is offset from the central plane of the anti-friction bearing so as to have a generally diagonal axis 37. The fitting preferably has a one-way zerk valve 36 therein preventing the escape of lubricant from the primary grease chamber 30. A gun 38 fits over the zerk fitting in the usual manner both to lubricate the bearing initially and to re-lubricate it periodically.

At the center of its inner side, the outer race 20 presents a groove 40 confronting a companion outwardly-facing groove 42 on an inner race 44 so as to mutually define a generally toroidal raceway. The raceway receives a plurality of circumferentially spaced apart ball bearing elements 46, the spacing of which is maintained by retainer rings 48 and 50 that are projection-welded together at successive points 52.

Although the interior 54 of the inner race 44 may be formed as a square opening to receive an arbor bolt having a square cross section, the interior 54 as actually illustrated is circular for reception of either a round section arbor bolt, or a disk harrow spool or spacer. The present unit cartridge is primarily adapted in this manner for mounting the arbor on which the plural disks of an agricultural harrow are mounted. Severe shock loadings are encountered and the operating conditions are exceedingly stringent. The self-aligning feature enables the arbor bolt to flex and recover readily, relieving the anti-friction bearing of the severe misalignment stress to which it otherwise would be subjected.

Radially inwardly extending end flanges 56 and 58 integral with the respective cartridge halves 14 and 16 define, with the anti-friction bearing, axial gaps forming secondary grease chambers 60 and 62 in which the lubricant is forced primarily radially outwardly so as to coat and collect throughout the space generally indicated at 64 between the outer race 20 and the cartridge. The inner periphery of the flanges 56 and 58 at each end of the inner race 44 confronts the outer surface of the inner race at that end, and together therewith define a pair of radial clearance gaps 66 and 68 which are shown exaggeratedly narrow for the purpose of illustration and through which lubricant is forced to escape externally primarily axially. The blocking barrier of grease contained in the secondary grease chambers, of which the respective gaps 66 and 68 are a part, is illustrated only in FIGURE 2. From this figure, it is apparent that when the pressed shroud halves of the bearing are riveted together and the chambers thereof are grease filled, the bearing becomes a sealed bearing cartridge, sealed in part against outside contaminants by its own supply of secondary lubricant. The gaps 66 and 68, and to a lesser degree the oversize hole 32 in the cartridge, accommodate movement of alignment of the anti-friction bearing and provide an external escape path for flushed lubricant coming out the bearing.

One-way-opening, identical, triplet seal elements 70 are carried by the anti-friction bearing in series connection between the primary grease chamber 30 and each of the secondary grease chambers 60 and 62 at the ends of the bearing.

More particularly as shown in FIGURE 4, each triplet seal element 70 comprises a ring-shaped retainer 72 of J-shaped cross section, being disposed in one of the ends of the outer race 20 and being press-fitted in that end. Three identical ring seals 74 are secured in the retainer 72 at their outer edges by means of three spacer rings 76 within the retainer 72, and their free inner ends form one-way-opening lips 78 engaging the confronting outer surface of the inner race 44. The ring seals 74 are illustrated to be of a non-metallic elastomer material. In practice, they have a fabric core, which better resists abrasion, and the fabric core is deeply impregnated and cured on opposite sides with a grease-resistant coat such as Buna N synthetic rubber. Periodic flushing of these seals clears the lips of grit and fine contaminants which would normally accelerate their wear rate. The cartridge flanges 56 and 58 due to their closely spaced proximity to the outer surface of the inner race 44, formidably shroud the seal elements 70 from abrasion by coarse contaminants such as fibrous grasses, wire, or string tending to wrap around the rotating arbor in the harrow implement. Such shrouding appreciably extends the seal life.

When the unit cartridge is lubricated initially, and subsequently, lubricant is forced in a path of flow entering the zerk fitting and the passage 28 leading through the outer ring 20, filling the primary grease chamber 30, emitting from the primary grease chamber 30 in the direction of an arrow in FIGURE 4, and forcing outwardly past the one-way-opening lips 78 of the seal element, and preferentially filling the secondary grease chambers 60 and 62 before lubricant comes out of the bearing in any substantial amounts.

Following is an example of the specifications and dimensions of the present bearing:

Clearance opening 32 _____ 1" diameter, round.
Maximum cross dimension of
  hexagonal shape 31 _____ 3/4".
Balls 46 _____ 1/2" diameter.
Numbers of balls 46 _____ 9.
Lubricant _____ Shell Alvania No. 3 grease.
Interior surface 54 _____ 1 3/4".
Axial thickness of unit cartridge _____ 1 3/4".
Radial gaps 66 and 68 _____ 1/32" average.
Axial gaps 60 and 62 _____ 1/16" average.
Outside of flanges 65 and 58 _ Cyanide skin hardened to resist external abrasion.

It is apparent that jolts communicated from the harrow disks are reacted through the arbor bolt into one or more of the supporting bearing cartridges, causing the anti-friction bearing to rock generally, but not necessarily always, in a vertical plane. The space in the gaps 60, 62, 66 and 68 changes with a breathing-like action at the opposite top and bottom sides of the secondary chambers, resulting in a pumping effect to replenish the grease film on the interface 22 of sliding contact about the outer race of the anti-friction bearing. The gaps just enumerated always have at least a part filling of lubricant and, when the bearing is idle over a period, that part fill of lubricant prevents corrosion and freeze-up of the outer race within the cartridge.

Variations within the spirit and scope of the invention described are equally comprehended by the foregoing description.

What is claimed is:
1. A self-aligning bearing assembly comprising:
  a supported race and a supporting shroud member disposed one within another, and with the race being relatively movable and having an interior grease chamber therein;
  generally radial end flanges to shroud the shroud member and carried thereby in outside locations axially opposite to the ends of the supported race, each flange extending radially inwardly to provide a narrow gap with an inner race;
  said race directly carrying a grease introducing fitting communicatively connected to the interior thereof and rigidly affixed thereto, and projecting externally through an outside oversize opening in the shroud member so as to shift therewithin and, by taking up the clearance therein in the direction of rotative movement, to limit relative rotational movement between the race and the shroud member;
  the supported race having a portion carried at the ends so as to move with the race and, in taking up the axial clearance between it and the different opposite end flanges because of the race tilting in different directions, so as to limit relative tilting movement of the supported race and the supporting shroud member transversely to their relative rotational movement aforesaid.

2. A self-aligning bearing assembly comprising:

outer race and shroud parts disposed one within the other and with the race being relatively movable and having an interior grease chamber therein;

said race part directly carrying a grease introducing fitting communicatively interconnected with the interior thereof and rigidly affixed thereto, and projecting externally through an outside oversize opening in the shroud part; and generally radial end flanges to shroud the shroud part and carried thereby in outside locations opposite to the ends of the outer race part, each flange extending radially inwardly to provide a narrow gap with an inner race;

said fitting having a gun-receiving tip at the free end and, at an intermediate point, having an enlarged, wear surface portion engageable with different sides of said oversize opening when accommodating to limited relative rotational movement between the parts;

said outer race part having a portion at the ends engageable with different ones of said end flanges when accommodating to limited relative tilting movement of the parts transversely to their relative rotational movement aforesaid.

3. A unitary self-aligning bearing of the type adapted to rotatably support a shaft, said bearing comprising:

an anti-friction unit having a movable outer race member and a lubricant holding interior;

a relatively fixed member adapted to support the outer race member, the two said members having coacting surfaces of spherical cross section;

grease passage means extending from a reception end thereof through the race member to an internal point communicating with the interior of the anti-friction unit;

a single combined motion-keying and grease fitting rigidly seated in the reception end of said passage means and loosely passing through a registering oversize clearance opening in the support member to accommodate limited universal movement of the anti-friction unit; and generally radial end flanges on said support member for shrouding same, disposed one at each end and confronting the outer race member at that end in clearance forming relationship, each flange extending radially inwardly to provide a narrow gap with an inner race;

said universal movement being limited in the direction of rotation because rotating the fitting eliminates the intervening clearance in said opening, and limited in a direction which is transverse to said direction of rotation because tilting of the outer race member one way or the other eliminates clearance between it and one or the other of the confronting end flanges.

4. A unitary self-aligning bearing assembly of the type adapted to rotatably support a shaft, said assembly comprising:

a lubricant containing bearing unit including a movable outer race member;

a relatively fixed member adapted to support the outer race member, the two said members having coactive surfaces of spherical cross section;

generally radial end flanges providing shrouds at the ends of said support member and forming, with the bearing unit, axially-gapped means in which lubricant is forced primarily radially, and narrow, radially-gapped escape means through which lubricant is forced to escape externally primarily axially;

the interior of said bearing unit defining primary grease chamber means;

said axially-gapped means defining secondary grease chamber means directly communicating with said coacting surfaces;

fitting means through which lubricant is introduced directly into the primary grease chamber means; and non-metallic seals carried by the bearing unit between the primary and secondary grease chamber means;

said axially-gapped means having a larger gap than, and adjoining the narrow gapped escape means, and cooperatnig with the seals to afford forced flow of flushed lubricant in a path emitting from the filled primary grease chamber means, forcing past the seals, and preferentially filling the secondary grease chamber means prior at least to any substantial escape of lubricant externally through the narrow gapped means.

5. A unitary self-aligning bearing assembly of the type adapted to rotatably support a shaft, said assembly comprising:

a lubricant containing bearing unit including a movable outer race member;

a relatively fixed member adapted to support the outer race member, the two said members having coacting sliding surfaces of spherical cross section;

generally radial end flanges on said support member shrouding the ends thereof and forming, with the bearing unit, axially-gapped means in which lubricant is forced primarily radially, and narrow radially-gapped means in which lubricant is forced to escape externally primarily axially;

the interior of said bearing unit defining primary grease chamber means;

said axially-gapped means defining secondary grease chamber means directly communicating with said coacting surfaces;

grease passage means extending from a reception end thereof through the race member to an interior point of said bearing unit communicating with the primary grease chamber means for filling same;

a single-combined motion-keying and grease fitting tightly seated in the reception end of said passage means and loosely passing through a registering oversize clearance opening in the support member to accommodate limited rotation of the axis of the shaft member; and elastomeric seals carried by the bearing unit between the primary and secondary grease chamber means;

said axially-gapped means having a larger gap than the narrow gapped means, and cooperating with the seals to afford forced flow of flushed lubricant in a path emitting from the filled primary grease chamber means, forcing past the seals, and preferentially filling the secondary grease chamber means prior at least to substantial escape of lubricant externally through the narrow gapped means.

6. A unitary self-aligning bearing of the type adapted to rotatably support an arbor, said bearing comprising:

a bearing unit including a movable outer race member;

a relatively fixed member adapted to support the outer race member, the two said members having coacting surfaces of spherical cross section;

said support member consisting of a shroud formed of substantially identical, pressed sheet metal halves which are complementarily secured together by fasteners;

a combined grease and motion-keying fitting projecting through the coacting surfaces and received in first and second openings in the respective support and race members;

said first opening being oversize to provide a clearance gap laterally of the fitting whereby the adjacent coacting surfaces and the fitting accommodate limited universal movement between said members, as limited in the direction of rotation by the fitting moving
against a side of the opening in the support member;

said second opening rigidly affixing the fitting in said
race member in fluid-tight relation thereto and communicatively interconnecting the fitting and the interior of the bearing unit for the forcing of lubricant
into the latter in all relative positions of the bearing unit; and generally radial end flanges on said metal halves disposed one at each end confronting the outer race
member at that end, and cooperating in limiting the
universal movement, in the direction transverse to
said direction of rotation, by the outer race member moving against the side of the confronting end
flange, each flange extending radially inwardly to
provide a narrow gap with an inner race.

7. A unitary self-aligning bearing of the type adapted
to rotatably support an arbor, said bearing comprising:
a bearing unit including a movable outer race member;
a relatively fixed member adapted to support the outer
race member, the two said members having coacting sliding surfaces of spherical cross section;
said support member consisting of a shroud formed
of substantially identical, pressed sheet metal halves
which are complementarily secured together by
fasteners;
generally radial end flange shrouds on said support
member permanently unitizing and closing the bearing against disassembly, and forming, with the bearing unit, axially-gapped means in which lubricant
is forced primarily radially, and narrow, radially-gapped escape means in which lubricant is forced
to escape externally primarily axially;
the interior of said bearing unit defining primary grease
chamber means;
said axially-gapped means defining secondary grease
chamber means serving as a source of lubricant for
and directly connected to said coacting surfaces;
a combined motion-keying and grease fitting projecting through the coacting surfaces and received in
first and second openings in the respective support
and race members;
said first opening being oversize to provide a clearance
gap laterally of the fitting whereby the adjacent coacting surfaces and the fitting accommodate limited
rotational movement between said members, as
limited in different directions by engagement of the
moving fitting against a side of the opening in the
support member;
said second opening rigidly affixing the fitting in said
race member in fluid-tight relation thereto and communicatively interconnecting the fitting and the interior of the bearing unit for forcing lubricant into
the latter; and
seals carried by the bearing unit between the primary
and secondary grease chamber means;
said axially-gapped means having a larger gap than,
and adjoining the narrow gapped escape means, and
cooperating with the seals to accommodate force-flushed lubricant in a path of flow emitting from the
filled primary grease chamber means, forcing past
the seals, and preferentially filling the secondary
grease chamber means prior at least to any substantial escape of lubricant externally through the
narrow gapped means.

8. A unitary self-aligning bearing of the type adapted
to rotatably support an arbor, said bearing comprising:
a bearing unit including a movable outer race member;
a relatively fixed member adapted to support the outer
race member, the two said members having coact-
in surfaces of spherical cross section;
said support member consisting of a shroud formed
of substantially identical, pressed sheet metal halves
which are complementarily permanently secured together;
generally radial end flanges providing shrouds at the
ends of the sheet metal halves and forming, with
the bearing unit, axially-gapped means in which
lubricant is forced primarily radially, and narrow
radially-gapped means in which lubricant is forced
to escape externally primarily axially;
the interior of said bearing unit defining primary grease
chamber means;
said axially-gapped means defining secondary grease
chamber means serving as a source of lubricant for
and directly connected to said coacting surfaces;
fitting means through which lubricant is directly introduced into the primary grease chamber means;
an opening in said support member in which lubricant
is forced to escape externally primarily axially from
said coacting surfaces; and
non-metallic seals carried by the bearing unit between
the primary and secondary grease chamber means;
said axially-gapped means having a larger gap than
the narrow gapped means, and cooperating with the
seals to accommodate force-flushed lubricant emitting in a path of flow from the filled primary grease
chamber means, forcing past the seals, filling the
secondary grease chamber means, and discharging,
after filling the latter, in split paths one leading between said coacting surfaces so as to escape externally through said opening, and the other providing
escape externally through the narrow gapped means.

9. A unitary self-aligning bearing of the type adapted
to rotatably support an arbor, said bearing comprising:
an anti-friction unit including a movable outer race
member;
a relatively fixed member adapted to support the outer
race member, the two said members having coacting
sliding surfaces of spherical cross section;
generally radial end flanges shrouding the ends of said
support member and forming, with the bearing unit,
axially-gapped means in which lubricant is forced
primarily radially, and narrow, radially-gapped escape means in which lubricant is forced to escape
externally primarily axially;
said anti-friction unit further including an inner race,
bearing elements between the inner and outer races,
bearing spacing, grease-retaining rings in the interior
of said anti-friction unit in engagement with the
bearing elements, the interior of said anti-friction
unit defining primary grease-chamber means;
said axially-gapped means defining secondary grease-chamber means serving as a lubricant source for and
directly connected to said coacting surfaces;
fitting means through which lubricant is introduced
into the interior of said bearing unit to fill the primary grease-chamber means; and
seals carried by the anti-friction unit between the primary and secondary grease-chamber means;
said axially-gapped means having a larger gap than,
and immediately adjoining the narrow-gapped escape means, and cooperating with the seals to accommodate force-flushed lubricant in a path of flow
emitting from the filled primary grease-chamber
means, forcing past the seals, and preferentially filling the secondary grease-chamber means prior at
least to substantial escape of lubricant externally
through the narrow-gapped means.

10. A unitized bearing of the type adapted to rotatably
support a shaft, said bearing comprising:
an anti-friction unit including a movable outer race
member;
a relatively fixed member adapted to support the outer
race member, the two said members having coacting
sliding surfaces of spherical cross section;
generally radial end flanges shrouding the ends of said
support member and forming, with the anti-friction unit, axially-gapped means in which lubricant is forced primarily radially, and narrow radially-gapped means in which lubricant is forced to escape externally primarily axially;

the interior of said anti-friction unit defining primary grease-chamber means;

said axially-gapped means defining secondary grease-chamber means serving as a lubricant source for and directly connected to said coacting surfaces;

elastomeric seals carried by the bearing unit between the primary and secondary grease-chamber means; and a combined grease and motion-keying fitting projecting through the coacting surfaces and received in first and second openings in the respective support and race members;

said fitting having one end opposite to a gun-receiving tip-end thereof, and having an enlarged, wear-surface area located between said one end and the gun-receiving tip-end;

said first opening being oversize to provide a clearance gap laterally of the wear-surface portion of the fitting, whereby the adjacent coacting surfaces and the fitting accommodate limited rotational movement of the anti-friction unit relative to the support member, limited in different directions by the wear-surface portion of the fitting moving against a side of the opening in the support member;

said second opening rigidly affixing the fitting at its said one end in the race member in fluid-tight relation thereto, and communicatively interconnecting the fitting at the one end and the interior of the anti-friction unit for the forcing of lubricant into the latter in all relative positions of the anti-friction unit.

11. The invention according to claim 10, wherein the enlarged wear-surface area between the gun-receiving tip-end and said one end of the fitting comprises a non-circular tool-receiving portion.

12. A unitary self-aligning bearing assembly of the type adapted to rotatably support an arbor, said assembly comprising:

an anti-friction unit including a movable outer race member;

a relatively fixed member adapted to support the outer race member, the two said members having coacting surfaces of spherical cross section;

said support member consisting of a shroud formed of substantially identical, pressed sheet metal halves;

said shroud halves presenting radially outwardly extending central attachment flanges secured together by mutual permanent fasteners to form a central circumferential rib on the support member;

said shroud halves presenting radially inwardly extending shroud flanges on the respective ends of said support member and forming, with the anti-friction unit, axially-gapped means in which lubricant is forced primarily radially, and narrow, radially-gapped escape means in which lubricant is forced to escape externally primarily axially;

an opening formed in one of said shroud halves at a point between the associated radially outwardly extending flange thereof and the radially inwardly extending flange, and communicating with the coacting surfaces;

the interior of said anti-friction unit defining primary grease chamber means;

said axially-gapped means defining secondary grease chamber means serving as a source of lubricant for and directly connected to said coacting surfaces;

fitting means through which lubricant is introduced directly into the interior of said anti-friction unit so as to fill the primary grease chamber means; and sets of plural seals carried one at each end by the anti-friction unit between the primary and secondary grease chamber means and each set providing at least triple sealing lips;

said axially-gapped means having a larger gap than, and directly adjoining the narrow gapped escape means, and cooperating with the plural seals to afford force-flushed lubricant in a path of flow emitting from the filled primary grease chamber means, forcing past the seals, and preferentially filling the secondary grease chamber means prior at least to substantial escape of lubricant externally through the narrow gapped means and/or said opening.

13. A unitized bearing of the type adapted to rotatably support an arbor, said bearing comprising:

permanently pre-assembled anti-friction means provided with an outer race;

a supporting shroud therefor having end flanges permanently unitizing and closing the bearing against disassembly and defining, outside of said anti-friction means, secondary grease chamber means which has an external discharge path and of which no more than a major portion thereof is occupied by said outer race;

said anti-friction means providing anti-friction support for the arbor and being self-aligning within the supporting shroud, said anti-friction means defining primary grease chamber means within the outer race, adapted to be charged with lubricant; and one-way-opening seals within the anti-friction means in series connection between the primary and secondary grease chamber means to accommodate force-flushed lubricant in a path of flow emitting from the filled primary grease chamber means, forcing past the one-way-opening seals, and preferentially filling the secondary grease chamber means prior at least to substantial escape of lubricant through said external discharge path, said secondary grease chamber means affording a grit-collecting and wetting chamber to minimize abrasive action on the seals by contaminant entering through the external discharge path.

14. The invention according to claim 13, wherein the interface of contact between the outer race of the anti-friction means and the supporting shroud is frusto-spherical, and is communicatively connected with the secondary grease chamber means for lubrication thereby;

and further comprising an external opening in said shroud intersecting the lubricated interface of contact; and means through which lubricant is introduced into the primary grease chamber means.

15. A unitary self-aligning bearing assembly of the type adapted to rotatably support a shaft, said assembly comprising:

a lubricant containing bearing unit having outer and inner races and a plurality of included anti-friction elements therebetween; and a relatively fixed member adapted to support the outer race, and together therewith having coactive surfaces of spherical cross-section;

said support member comprising end flanges which are on the outer ends of the body thereof and which extend radially inwardly therefrom;

the inner race extending externally beyond the end flanges and the end flanges extending externally beyond the outer race;

the flange at each outer end of the support member forming, with the outer and inner races, respectively, axially gapped means with, and being engageable by, the end of the outer race at that end so as to limit transverse movement of such race as the bearing axis adjusts, and radially gapped, restrictive escape means through which externally escaping lubricant is forced primarily axially;

the exterior of said bearing unit defining primary-grease chamber means;

said primary grease chamber means, axially gapped means, and radially gapped escape means adjoining one another; and a port in the outer bearing race and a registering opening in the support member arranged whereby lubricant from a grease fitting on the bearing assembly can be forced in a path of flow entering said port, filling said primary grease chamber means, and preferentially filling said axially gapped means prior at least to any substantial escape of lubricant externally through the radially gapped escape means.

References Cited by the Examiner

UNITED STATES PATENTS

| | | | |
|---|---|---|---|
| 1,825,293 | 9/1931 | Van Derhoef | 308—194 |
| 2,761,746 | 9/1956 | Abel | 308—72 |
| 2,771,326 | 11/1956 | Smith et al. | 308—181 |
| 2,856,245 | 10/1958 | Liester | 308—187 |

MARTIN P. SCHWADRON, *Primary Examiner.*

FRANK SUSKO, *Examiner.*